Aug. 18, 1953     J. VAN DER HEEM     2,648,856
FRICTION VIBRATION DAMPING MEANS FOR FLOOR POLISHERS
Filed March 17, 1948

INVENTOR.
Jan van der Heem
BY
Wenderoth, Lind & Ponack
Attorneys

Patented Aug. 18, 1953

2,648,856

UNITED STATES PATENT OFFICE 2,648,856

FRICTION VIBRATION DAMPING MEANS FOR FLOOR POLISHERS

Jan van der Heem, Voorburg, Netherlands

Application March 17, 1948, Serial No. 15,449
In the Netherlands April 15, 1947

6 Claims. (Cl. 15—49)

This invention relates to a vibration damper for electric floor polishers.

An object of the invention is to provide a vibration damper for electrical floor polishers which will eliminate the vibrations and disadvantageous movements of the rotating rubbing body.

A further object of the invention is to provide a vibration damper which will eliminate vibrations arising from the motor.

With the above and other objects in view which will become apparent from the description in detail below, the invention is shown in the drawings in which.

In the various figures like parts are referred to by similar reference characters.

Figure 1:
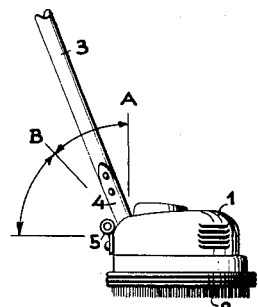
Fig. 1 is a side view of a floor polisher having the vibration damper associated therewith.
Figure 2:
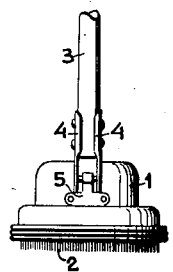
Fig. 2 is a rear view of the floor polisher.
Figure 3:
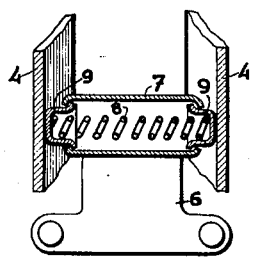
Fig. 3 is a cross-sectional view with parts in elevation illustrating the vibration damper.

Referring to Fig. 1, the floor polisher comprises a hood 1 and a rotating brush 2. Located within the hood 1 is an electric motor which drives the brush 2.

A handle 3 has connected to it at its lower end a pair of spaced legs 4 and the lower ends of the legs 4 are pivotally connected to the body 1 in any desired way.

When the handle 3 is in its more vertical position such as within the sector A—B in Fig. 1 the handle and the hand of the operator will absorb the majority of the vibrations from the floor polisher.

However, when the handle moves below the sector A—B then these vibrations are not absorbed and when the handle is in such position the vibration damper 5 comes into action. The damper 5 is fixed by means of a plate 6 to the body 1 and comprises a cylindrical portion 7 within which a spring 8 is located. At the ends of the spring 8 within the cylinder are two pressure members 9 slidingly mounted in the cylinder which are designed, when the handle 3 is lowered, to contact and press against the legs 4 thereby absorbing vibrations of the body 1 and the brush 2. Preferably the legs 4 are positioned upon the handle 3 so that the widest portion between the legs 4 is at the rear while the spacing at the forward part is somewhat narrower.

Figure 4:
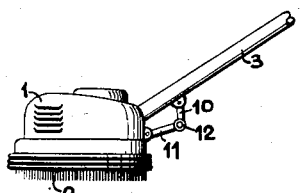
Fig. 4 is a side view illustrating a modification.

In Fig. 4 is shown a modification wherein the vibration damper consists of two arms 10 and 11 which are pivotally connected to the handle 3 and to the body 1 respectively. These arms are so connected pivotally with one another by means of friction plates 12 so that the friction in the handle increases as the handle is lowered.

I claim:

1. An electric floor polisher comprising a hood, a driving motor in said hood, a rotatable single rubbing element in said hood operatively connected to said motor, a handle pivotally connected to the hood, the pivot point being astern and on the side of the hood and thereby eccentric with respect to said hood and a friction member forming a vibration damper fixed to said hood in proximity to the pivot point of said handle for cooperating with said handle for damping vibrations of the polisher by friction between the damper and the handle when said handle is pivoted below a predetermined position, said vibration damper being between the rear of said handle and the bottom of said hood.

2. An electric floor polisher comprising a hood, a driving motor in said hood, a rotary single rubbing element partially contained in said hood and operatively connected to said driving member, pivoting means eccentrically connected to said hood on a side and astern thereof, a handle pivotally connected to said hood by said pivoting means eccentric with respect to said hood, a friction member forming a vibration damper fixed to said hood in proximity to said pivoting means, said vibration damper being between the rear of said handle and the bottom of said hood, said handle contacting said vibration damper when said handle is pivoted below a predetermined position whereby vibrations of the polisher are damped by friction between the vibration damper and the handle in contacting position of said handle with said vibration damper.

3. An electric floor polisher as set forth in claim 2 wherein said friction member forming said vibration damper comprises a cylinder, a spring in said cylinder and abutting plates outwardly urged by said spring for cooperating with said handle.

4. An electric floor polisher as set forth in claim 2 wherein said handle is provided at its lower portion with two spaced legs and said damper comprises a cylindrical element with outwardly urged end plates, each said spaced leg contacting one said end plate and having therebetween said end plates in frictional engagement.

5. An electric floor polisher as set forth in claim 4 wherein said damper cylinder is fixed horizontally to said body, a spring within said cylinder, said end members telescoping within said cylinder and being urged apart by said spring.

6. An electric floor polisher as set forth in claim 2 wherein said handle is provided at its lower portion with spaced legs at an inclination to one another, said vibration damper consisting in a spring urged damper cooperating with and between said inclined spaced legs.

JAN VAN DER HEEM.

References Cited in the file of this patent

UNITED STATES PATENTS

| Number | Name | Date |
|---|---|---|
| 913,801 | Ansley | Mar. 2, 1909 |
| 928,702 | Rodman | July 20, 1909 |
| 1,180,992 | Ferrarini | Apr. 25, 1916 |
| 1,689,032 | Johnson | Oct. 23, 1928 |
| 1,689,166 | Varner | Oct. 23, 1928 |
| 1,744,332 | Paton et al. | Jan. 21, 1930 |
| 1,867,708 | Paton | July 19, 1932 |
| 1,892,896 | Kirby | Jan. 3, 1933 |
| 2,142,697 | Myers | Jan. 3, 1939 |
| 2,268,015 | Broberg | Dec. 30, 1941 |
| 2,380,013 | Bankauf | July 10, 1945 |
| 2,396,847 | Hathaway | Mar. 19, 1946 |

FOREIGN PATENTS

| Number | Country | Date |
|---|---|---|
| 531,058 | Great Britain | Dec. 27, 1940 |
| 657,174 | Germany | Feb. 25, 1938 |